S. E. HORNER.
Thill Coupling.
No. 81,085.
Patented Aug. 18, 1868.
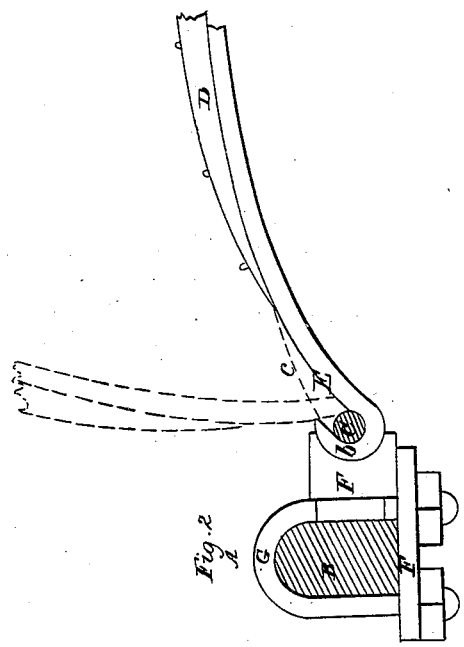
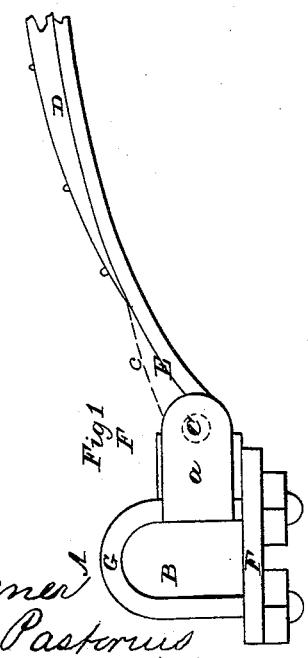

United States Patent Office.

SAMUEL E. HORNER, OF SHILOH, NEW JERSEY.

Letters Patent No. 81,085, dated August 18, 1868.

IMPROVEMENT IN THILL-COUPLING.

The Schedule referred to in these Letters Patent and making part of the same.

TO ALL WHOM IT MAY CONCERN:

Be it known that I, SAMUEL E. HORNER, of Shiloh post office, Cumberland county, in the State of New Jersey, have invented a new and useful Thill-Coupling for wagons, carriages, &c., &c.; and I do hereby declare that the following is a full, clear, and exact description of the same, reference being had to the accompanying sheet of drawings, and to the letters of reference marked thereon.

In this improvement the end of each thill or shaft terminates in a snap-hook, which takes over a stationary pin in the jaws of the clip. A rubber block is fitted between the jaws of the clip, behind the snap-hook, in such manner that its elasticity prevents the snap-hook from rattling on the thill-pin.

On reference to the accompanying sheet of drawings making part of this specification—

Figure 1 is a side view.

Figure 2 is also a side, with one jaw of the thill-clip removed, and

Figure 3 is a plan view.

Similar letters refer to similar parts in the several views.

A is a clip, which is fastened to the axle B in the usual manner. C is a thill-bolt, which is fixed immovably in the clip A. D is a thill or carriage-shaft, the iron or end of which, for the purpose of more readily adjusting or fixing on the thill-bolt C, forms a snap-hook, E. F is a rubber block which is inserted between the jaws $a$ of the clip; it is hollowed out in the front face to fit the snap-hook, so as to admit of an equal pressure in all positions. The bar F' of the yoke G has one of its ends extended to carry the gum block F, when the snap-hook is detached from the thill-bolt C. The thills are coupled to the axle by supporting them in the position shown by the red lines, fig. 2, whereby the resistance of the rubber to the hook $b$ is not sensibly felt. After pressing in the snap $c$, the hook is easily adjusted on the thill-bolt C. The snap-hook obviates the necessity of removing the thill-bolt when the thills or shafts are either coupled or uncoupled.

I am aware that rubber blocks have been interposed between the ends of carriage-shafts or thills, and the clips on the axle, to cause a pressure against the ends of the thills, and thereby bind them against the thill-bolts, to prevent rattling and other noise. I therefore do not claim rubber blocks except in combination with other parts.

What I claim as my invention, and desire to secure by Letters Patent, is—

The clip A, thill D, snap-hook E, and the gum block F, when combined as shown and described.

In testimony whereof, I hereunto sign my name to this specification in the presence of two subscribing witnesses.

SAMUEL E. HORNER.

Witnesses:
 ISAAC SWING,
 B. F. SWING, Jr.